Feb. 17, 1959   C. O. MUSSER   2,873,639
TOY PIANO HAVING KEY MOUNTED TONE BARS
Filed Oct. 20, 1958
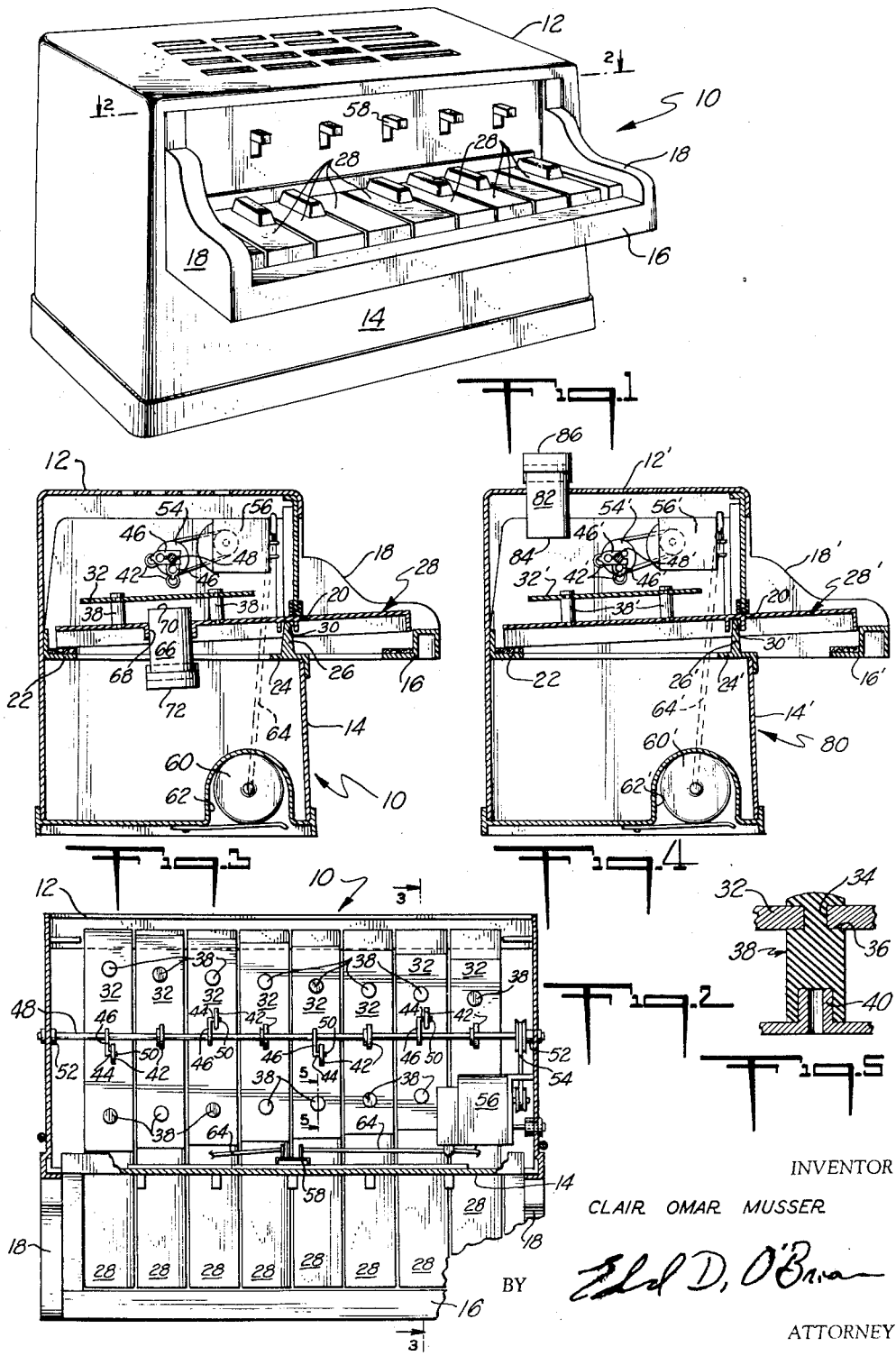
INVENTOR
CLAIR OMAR MUSSER
BY
ATTORNEY United States Patent Office 2,873,639
Patented Feb. 17, 1959

2,873,639

TOY PIANO HAVING KEY MOUNTED TONE BARS

Clair Omar Musser, Studio City, Calif.

Application October 20, 1958, Serial No. 767,081

12 Claims. (Cl. 84—404)

This invention relates to new and improved toy musical instruments.

Virtually every parent, at one time or another, by necessity suffers through a variety of disconcerting nondescript sounds produced by a child through the use of one or more common toy musical instruments. A basic objective of this invention is to proivde toy musical instruments which are capable, when properly constructed, of producing more melodious noises than can be produced by many of the known similar devices.

It is thought that the disconcerting sounds so often produced by common toy musical instruments are, at least in part, a result of the manner in which these instruments are constructed. Any toy musical instrument must be comparatively rugged in order to withstand the onslaught of the younger generation; further, it must be capable of being easily and conveniently produced on a mass production basis, at a cost which is not prohibitive. An object of this invention is to provide toy musical instruments which can be easily and conveniently produced by mass production techniques, and which, in spite of such production, are capable of producing comparatively harmonious, acceptable noises. A related object of the invention is to provide toy musical instruments which are rugged in construction so that it is conparatively impossible for the normal child to damage them, except with deliberate malice.

A further object of this invention is to provide toy musical instruments capable of producing sound effects closely resembling the sound effects which may be achieved by much more expensive adult instruments such as organs or the like. This latter objective of the invention is quite important inasmuch as children inherently try to imitate parents, and like to play with toys which bear at least a superficial resemblance, in appearance and performance, to apparatus or equipment which their parents use. The new toy musical instrument of this invention can be made to resemble in outward appearance a piano, or by appropriate inclusion and construction of resonating means, an organ. Through the use of special means for actuating sound generating elements employed with the toy musical instruments of this invention, it is possible to very closely simulate the sound produced by an electric organ. Such sound effects have not, it is thought, been satisfactorily achieved in any low cost device of the class described prior to this invention.

Further objects of this invention, as well as many specific advantages of it, will be more fully apparent from the remainder of this description, including the appended claims and the accompanying drawing in which:

Fig. 1 is a perspective view of a toy musical instrument of this invention;

Fig. 2 is a cross sectional view taken at line 2—2 of Fig. 1;

Fig. 3 is a cross-sectional view taken at line 3—3 of Fig. 2;

Fig. 4 is a view similar to Fig. 3 of a modified toy musical instrument of this invention; and Fig. 5 is a partial cross-sectional view taken at line 5—5 of Fig. 2.

In all figures of the drawing, like numerals are used to designate like parts whenever convenient for purposes of illustration and explanation. It is to be understood that this invention is not to be considered as being limited to structures having the precise proportional sizes or shapes illustrated inasmuch as a number of modifications may be made in the structures shown without departing from the essential nature of the present invention.

The actual features of this invention are considered to be fully defined or summarized in detail by the appended claims forming a part of this description. If desired, however, as an aid to understanding the invention, it may be briefly stated in summary form that this invention relates to toy musical instruments, each of which includes a support member, a plurality of arms movably mounted on this support member, a sound generating element mounted on each of these arms so as to be moved when each of the arms, is moved, and means for actuating each of these said sound generating elements so as to produce sound, these means being mounted on the support member adjacent to the arms so that when said arms are moved the sound generating elements are moved into a location where they are actuated by these means, causing sound to be produced.

In Fig. 1 of the drawing there is shown a toy musical instrument of the invention 10, which includes a housing 12 in the general shape of a rectilinear box having attached to the front side 14 thereof a ledge 16. This ledge is secured to the housing by means of end supports 18; it is located so as to be generally parallel to an elongated slot 20 formed in the front side 14 approximately midway between the top of the bottom of the housing 12. Within the housing 12 there is located an elongated support member 22 so that this support member is positioned generally parallel to the slot 20. An elongated bar 24 is mounted on the housing 12 so as to project through the slot 22, and so that a series of elongated projections 26 formed thereon project upwards generally toward the center of this slot.

Upon each of the projections 26 there is positioned a key or arm 28 so that an elongated recess 30 within the bottom of each of these keys fits over one of the projections 26. The recesses 30 are preferably of larger cross-sectional dimension than the projections 26 so that the keys 28 are capable of being rotated about these projections during the operation of the instrument 10. Thus in effect the projections 26 may be termed "fulcrums." The lengths of the recesses 30 and of the projections 26 are preferably the same so as to hold the keys 28 against movement along the length of the slot 20.

The keys themselves normally are located as shown in Fig. 3 of the drawings so that portions of them rest against the support member 22. As is best seen in the drawings, the extremities of the keys 28 furthest removed from the housing 12 are, in this position, spaced from the ledge 16 so that a child or other individual playing the instrument 10 can push upon any of the keys 28 rotating the key so actuated about a projection 26 in order to bring a tone bar 32 into engagement with the means for actuating this tone bar. The tone bars 32 are, with the preferred construction of the invention, formed so as to each include two openings 34 located therein so that these tone bars may be supported in notches 36 on resilient rubber supports 38. These supports 38 fit over cylindrical projections 40 formed on the keys 28 as shown in Fig. 5. Thus, the supports 38 resiliently hold the tone bars 32 upon the keys 28 so these tone bars are free to vibrate.

The tone bars 32 can be conveniently formed out of a number of commonly available materials such as stainless steel, aluminum or the like; they are so proportioned in size and dimension to produce a series of notes when the keys 28 are actuated. It is necessary that the supports 38 be formed out of a resilient material such as rubber or the like, if the vibrations produced by the tone bars 32 are not to be transmitted through the keys 28 when the instrument 10 is played. These keys may be conveniently formed out of wood or any common material such as polystyrene or the like, with a minimum of difficulty. In the preferred mode of manufacturing of the instrument 10, the tone bars 32 are assembled upon the keys 28 prior to the insertion of these keys within the housing 12.

The means for actuating the tone bars 32 so as to produce sound in the instrument 10 preferably comprise a plurality of percussion rings 42 formed out of metal or the like. These rings 42 are rotatably mounted upon projections 44 on arms 46 secured to a shaft 48; the rings 42 are prevented from coming off of the projections 44 by means of enlarged ends 50 on these projections. The shaft 48 is carried by bearings 52 secured to the housing 12; this shaft is adapted to be driven through a belt and pulley arrangement 54 by means of an electric motor 56 disposed within the housing 12. A switch 58 is attached to the front side 14 of the housing 12 in order to turn this motor on and off. If desired, the motor can be of the category which may be operated by household current supplied to the instrument 10 through an electric cord (not shown) or, if desired, this motor 56 may be actuated by conventional electric batteries 60 disposed in a battery cavity 62 within the housing 12. Internal wires 64 are employed to connect the batteries 60, the motor 56 and the switch 58 in a conventional manner.

It will be noted from an examination of Figs. 2 and 3 of the drawings that the arms 46 preferably project radially from the shaft in different directions. This is so that as the instrument 10 is played that the various rings 42 do not strike one or more of the tone bars 32 simultaneously so as to obtain a more pleasing musical effect than if all of the tone bars were actuated at one time.

The actual operation of the instrument 10 is relatively simple. A child merely presses upon one or more of the keys 28 bringing the tone bar 32 attached to each key so actuated into an upper position in which this tone bar is so spaced with respect to the shaft 48 that it is capable of being engaged by a ring 42. As the shaft turns, any such ring periodically engages the corresponding tone bar causing sound to be produced by this tone bar. In effect, a tremolo effect is thus produced. This tremolo effect achieved with the present invention closely resembles the tone which is obtained by an electric organ, and it is considered to be pleasing.

The use of the percussion rings 42 in the instrument 10 is noted. During the operation of the instrument these rings 42 are rotated about the projections 44 through engagement with the corresponding tone bars 32; also these rings can move slightly upon the projections 44 so that as they strike a tone bar a sharp blow is not applied to the tone bar, but instead the tone bar is actuated in a more gentle manner so as to produce vibrations. Thus, with this construction no sounds resembling the hitting of an anvil with a hammer result; the only musical tone noticed is one corresponding to the desired tone produced by a tone bar.

When it is desired to reinforce the tones produced by a tone bar 32 after the key 28 has been released, it is possible to dispose resonating columns 66 upon the keys 28 in the manner indicated in Fig. 3 of the drawing. The columns 66 are held within openings 68 in the keys 28 by an adhesive or other equivalent means. Each of the columns 66 has an open end 70 spaced from the center of a tone bar 32, and has a closed end 72 remote from this tone bar. The columns 66 appear as common tubes or cylinders.

The sizes of the column 66 are, of course, varied. In general the larger the tone bar 32, the longer the column 66 disposed beneath it is. These columns 66 are of such a dimension so as to effectively reinforce the tones or notes generated by vibration of corresponding tone bars 32. Because of the fact that the tone bars 32 are mounted on the keys 28 so as to be permanently spaced with respect to the resonating columns 66, the operation of these resonating columns is unaffected by the movement of the keys 28.

If desired, it is possible to provide a toy musical instrument 80 as shown in Fig. 4 of the drawing in which tone reinforcement by a resonating column varies as the instrument is played. Since the instrument 80 is identical with the instrument 10 previously described except for the resonating column structure the various identical parts of the instrument 80 are shown in the drawing designated by the primes of the numerals previously employed.

In the instrument 80 resonating columns 82 are employed instead of the columns 66 previously indicated. These columns 82 are graduated as to size in the same manner as the columns 66, and are provided with open ends 84 adjacent to, and above the ends of corresponding tone bars 32', and are provided with closed ends 86. With this construction as a key 28' is rotated so as to move the tone bar 32' attached to its so that this tone bar is engaged by a ring 42' in order to produce sound the spacing between this tone bar 32' and the corresponding column 82 is changed. As long as a key 28' is held so that its tone bar 32' is engaged by a maximum amount of sound reinforcement by the corresponding column 82 occurs. When the key 28' is is released the spacing between the tone bar 32' held by it and this resonating column increases, and the amount of sound reinforcement by the column 82 decreases quite rapidly because of this.

Those skilled in the art to which this invention pertains will realize that a large number of modifications may be made in the structures shown without departing from the essential nature of this invention. For this reason, the invention is to be considered as limited only by the appended claims forming a part of this description. Those skilled in the art to which this invention pertains will also realize that the various structures indicated herein are each very efficient to the purpose intended, are easily and cheaply manufactured, and are comparatively rugged. They will also realize that these structures are capable of producing pleasing sounds when actuated by a child.

This application is a continuation-in-part of the co-pending application Serial No. 561,420, filed January 26, 1956, entitled Toy Musical Instruments. The subject matter of this co-pending application is incorporated herein by reference.

I claim:

1. A toy musical instrument of the class described which includes: a housing having a front side formed with an elongated slot located therein; a key support ledge attached to said front side of said housing so as to project generally parallel to said slot; a plurality of projections capable of serving as fulcrums mounted on said housing adjacent to said slot so as to project upwards from the lower edge thereof; a support member positioned within said housing so as to project generally parallel to said slot; a plurality of keys, each having a top and a bottom and a recess located in the bottom thereof positioned so as to project through said slot into said housing with each of said recesses receiving one of said projections, said keys being supported in a normal position by said projections and said support member located within said housing, said keys being capable of being engaged on the outside of said housing so as to be pushed into engagement with said key support ledge so as to rotate said keys about said projections to a playing position; a tone bar resiliently attached to each of said keys so as to be moved to a playing position when said keys are moved to a playing position; a shaft rotatably mounted within said housing above said tone bars, said shaft being generally parallel to said slot; means operatively associated with said shaft and mounted in said housing for rotating said shaft; a plurality of arms attached to said shaft so as to project therefrom, each of said arms being located generally above one of said tone bars; means operatively associated with each of said arms for periodically striking one of said tone bars when said keys are actuated so as to rotate about said projections to a playing position.

2. A toy musical instrument as defined in claim 1 wherein said arms project radially from said shaft and wherein said arms are spaced about said shaft so as to project from said shaft in different directions.

3. A toy musical instrument as defined in claim 1 including a projection attached to each of said arms at an extremity remote therefrom, each of said projections having an enlarged end thereon; and wherein each of said means attached to said arms comprises a ring positioned on one of said projections, said rings being held on said projections by said enlarged ends and being capable of rotation about said projections.

4. A toy musical instrument as defined in claim 1 including a resonating column mounted adjacent to each of said tone bars, each of said resonating columns having an open end located immediately adjacent to one of said tone bars.

5. A toy musical instrument as defined in claim 4 wherein each of said resonating columns is mounted upon one of said keys.

6. A toy musical instrument as defined in claim 4 wherein said resonating columns are mounted on said housing.

7. A toy musical instrument of the class described which includes: a housing having a front side formed with an elongated slot located therein; a ledge attached to said front side of said housing so as to project generally parallel to said slot; a plurality of projections capable of serving as fulcrums mounted on said housing adjacent to said slot so as to project upwards from the lower edge thereof; a support member positioned within said housing so as to project generally parallel to said slot; a plurality of keys, each having a top and a bottom and a recess located in the bottom thereof positioned so as to project through said slot into said housing with each of said recesses receiving one of said projections, said keys being supported in a normal position by said projections and said support member located within said housing, said keys being capable of being engaged on the outside of said housing so as to be pushed into engagement with said key support ledge so as to rotate said keys about said projections; means extending upwards from each of said keys within said housing; resilient means located above each of said keys with respect to said means projecting upwards from said keys; a tone bar positioned upon said resilient means above each of said keys, each of said tone bars being held closely against lateral movement by said means projecting upwards from each of said keys; a shaft rotatably mounted within said housing above said tone bars, said shaft being generally parallel to said slot; means mounted in said housing for rotating said shaft; a plurality of arms attached to said shaft so as to project therefrom, each of said arms being located generally above one of said tone bars; means attached to each of said arms for striking one of said tone bars when said keys are actuated so as to rotate about said projections.

8. A toy musical instrument as defined in claim 7 wherein said arms project radially from said shaft and wherein said arms are spaced about said shaft so as to project from said shaft in different directions.

9. A toy musical instrument as defined in claim 7 including a projection attached to each of said arms at an extremity remote therefrom, each of said projections having an enlarged end thereon; and wherein each of said means attached to said arms comprises a ring positioned on one of said projections, said rings being held on said projections by said enlarged ends and being capable of rotation about said projections.

10. A toy musical instrument as defined in claim 7 including a resonating column mounted adjacent to each of said tone bars, each of said resonating columns having an open end located immediately adjacent to one of said tone bars.

11. A toy musical instrument as defined in claim 10 wherein each of said resonating columns is mounted upon one of said keys.

12. A toy musical instrument as defined in claim 10 wherein said resonating columns are mounted on said housing.

References Cited in the file of this patent

UNITED STATES PATENTS

| | | |
|---|---|---|
| 1,293,722 | Deagan | Feb. 11, 1919 |
| 2,052,890 | Marks | Sept. 1, 1936 |
| 2,279,143 | Lohr | Apr. 7, 1942 |
| 2,486,545 | Alvarez | Nov. 1, 1949 |
| 2,508,300 | Sjolander | June 6, 1950 |
| 2,510,094 | Fleury | June 6, 1950 |
| 2,541,143 | Zimmermann | Feb. 13, 1951 |
| 2,759,387 | Duncan | Aug. 21, 1956 |
| 2,799,196 | Alvarez | July 16, 1957 |

FOREIGN PATENTS

| | | |
|---|---|---|
| 567,657 | Germany | Apr. 6, 1933 |